Aug. 10, 1948. E. J. MAUST 2,446,978
DEFLUORINATION OF PHOSPHATE ROCK
Filed April 8, 1944 6 Sheets-Sheet 2
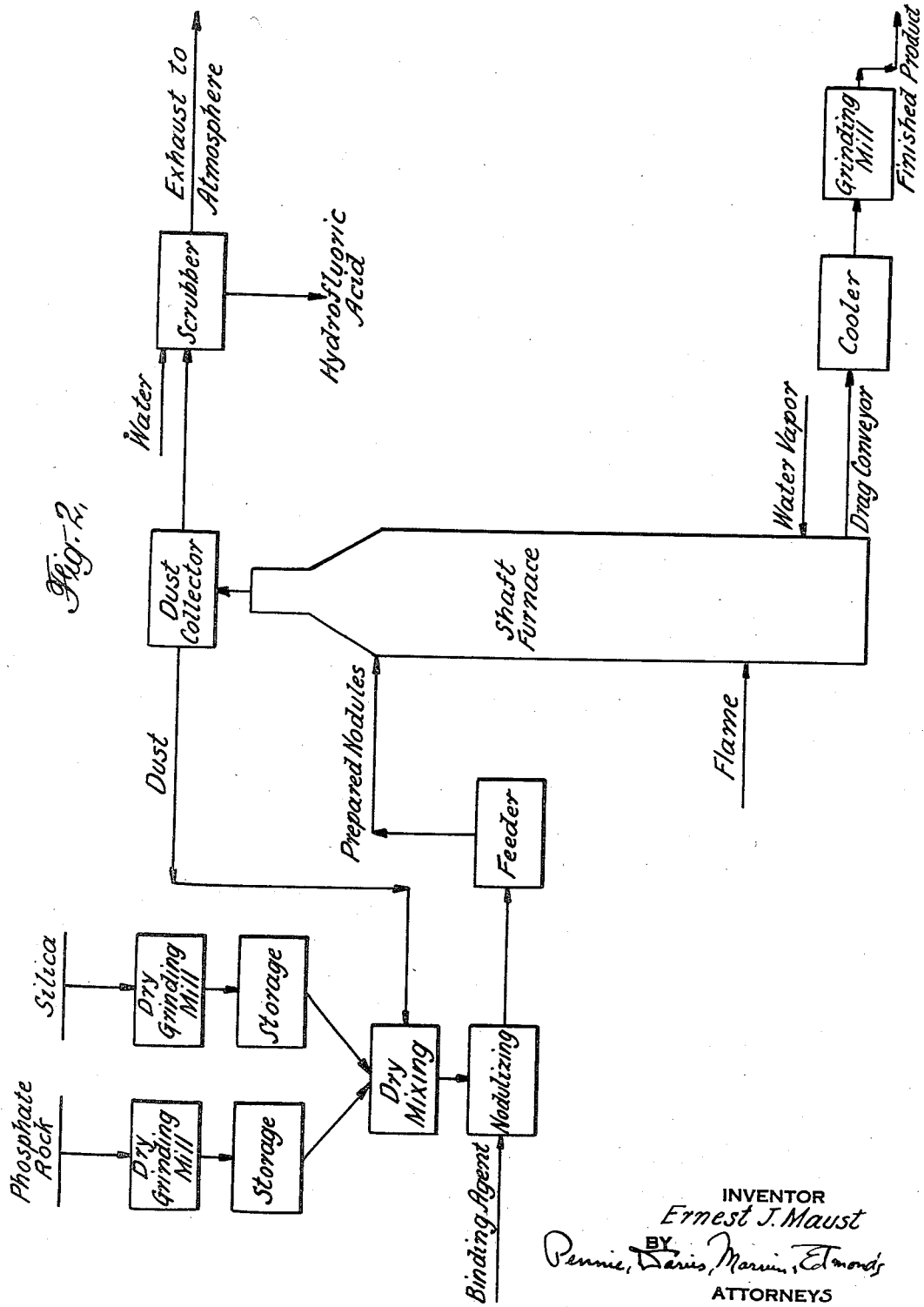
INVENTOR
Ernest J. Maust
BY
Pennie, Davis, Marvin, Edmonds
ATTORNEYS

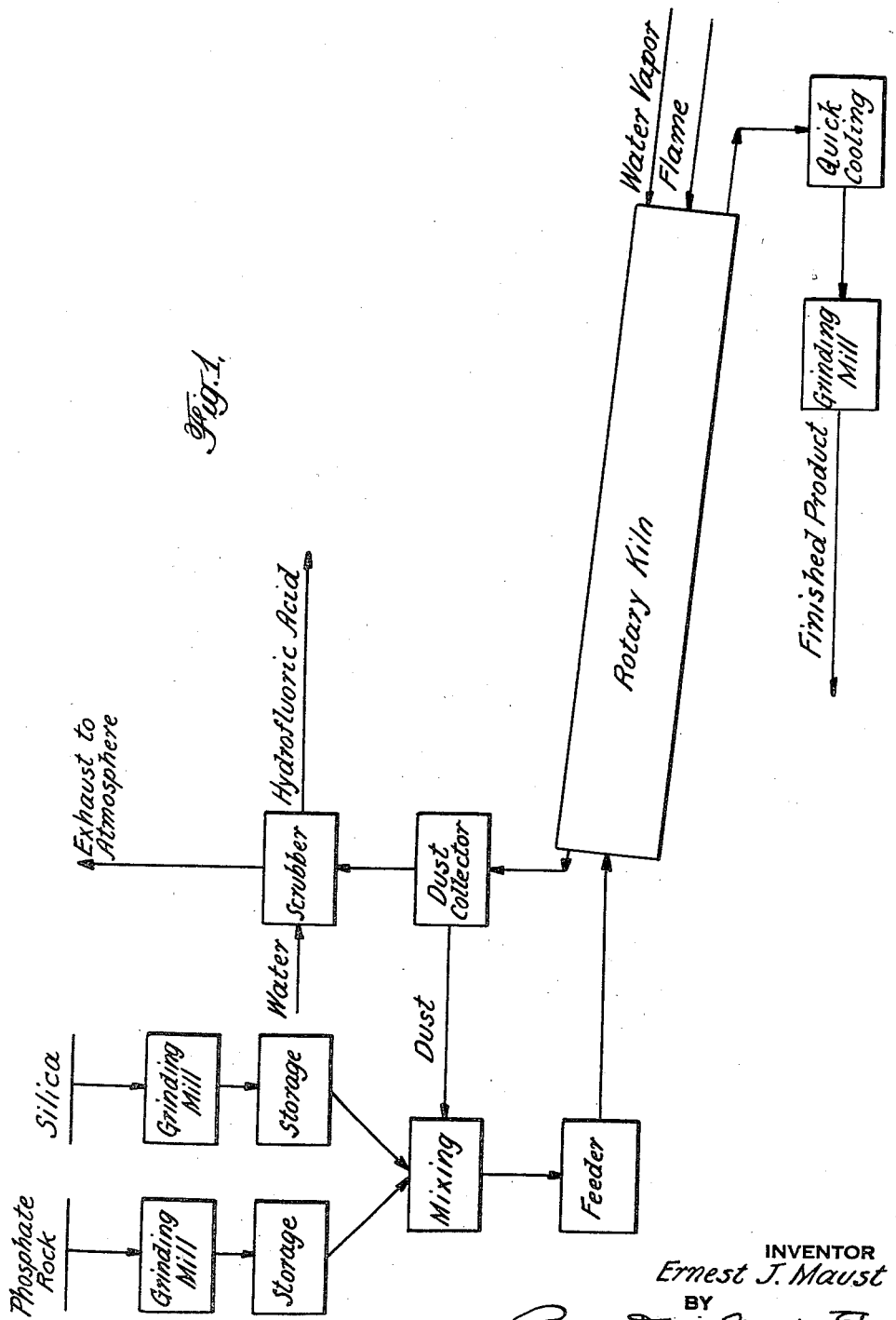

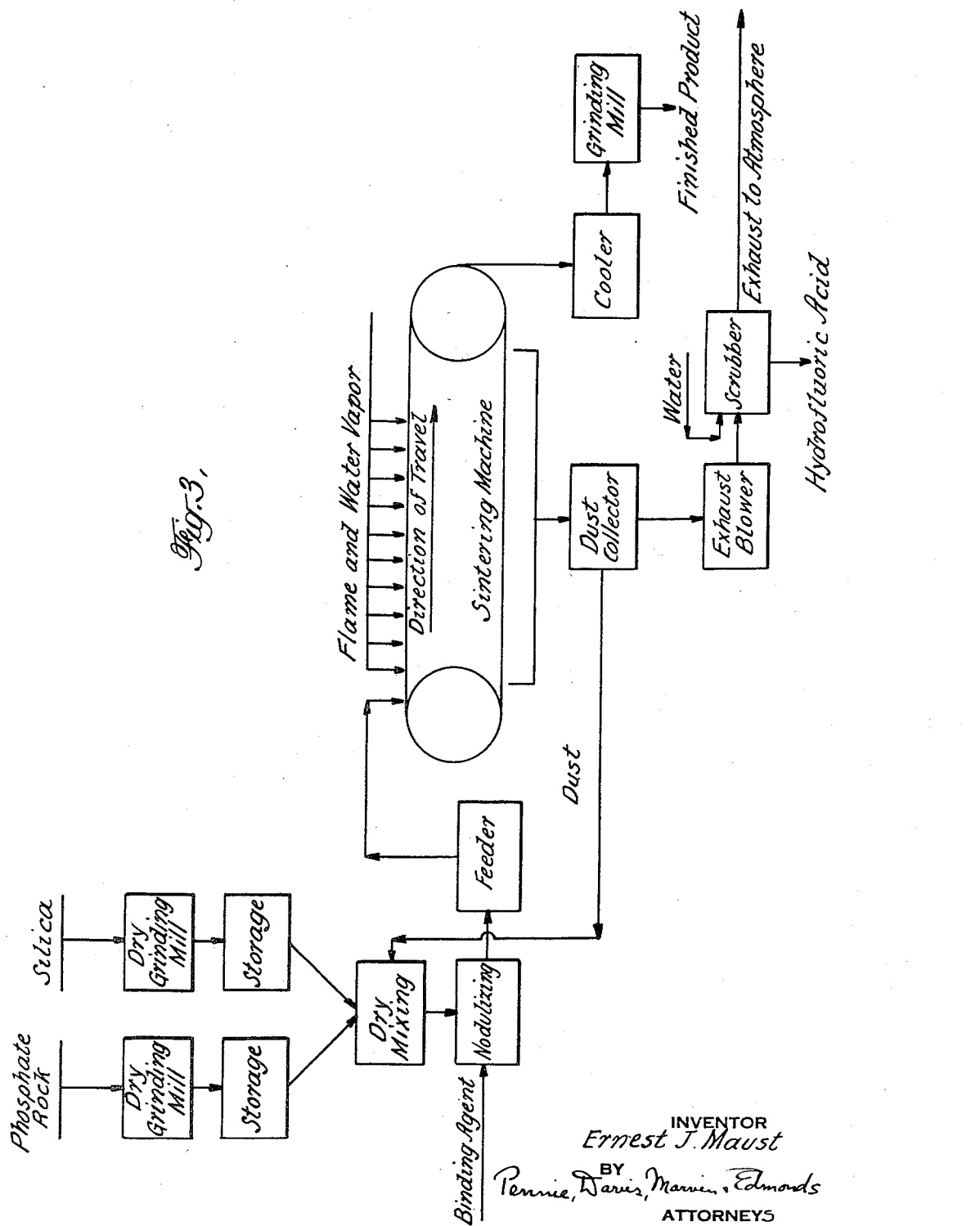

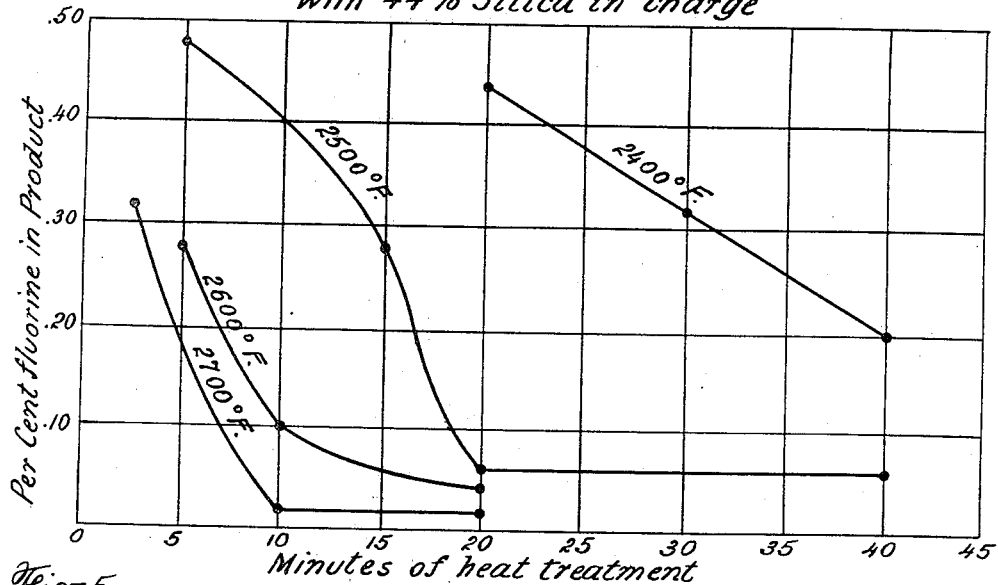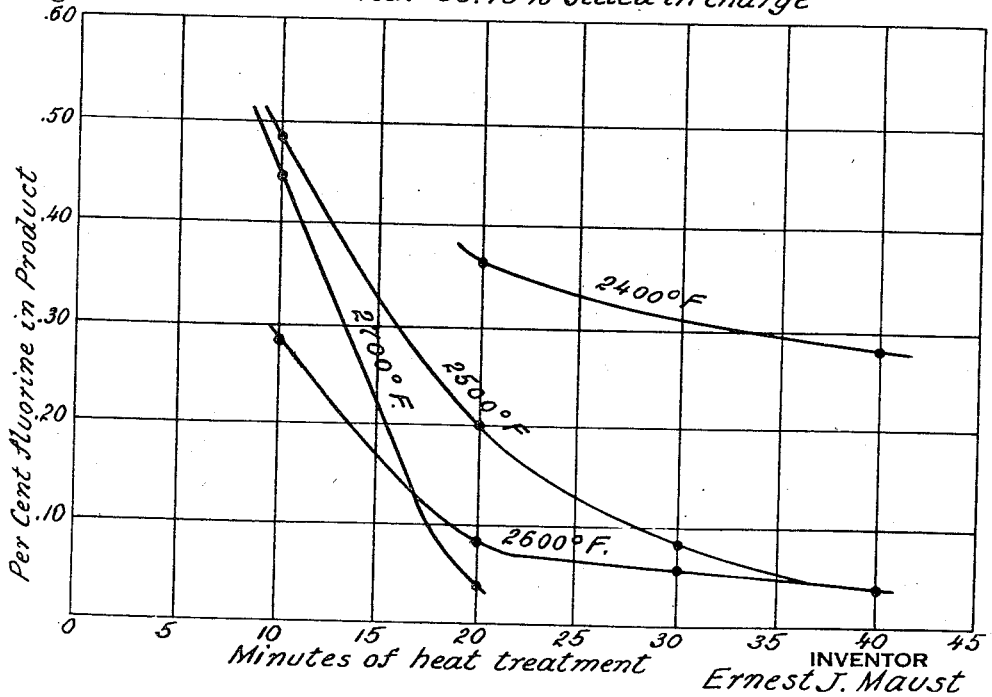

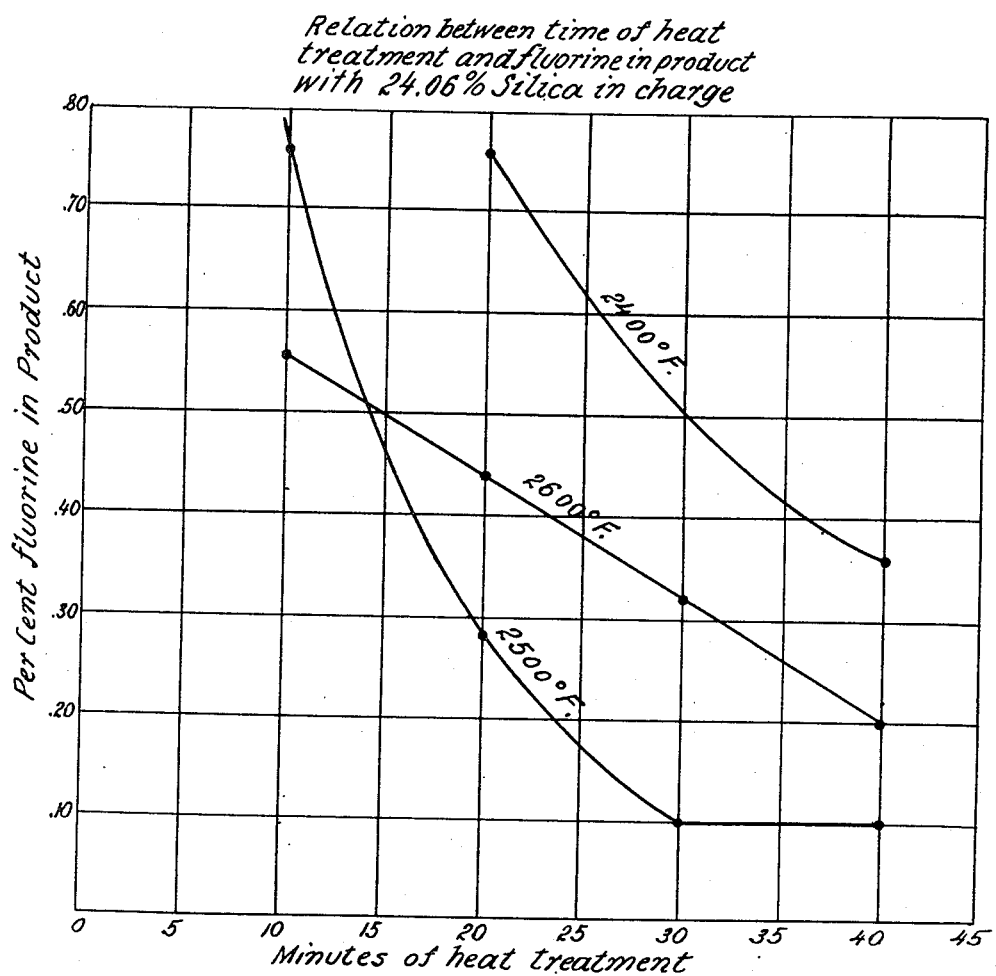

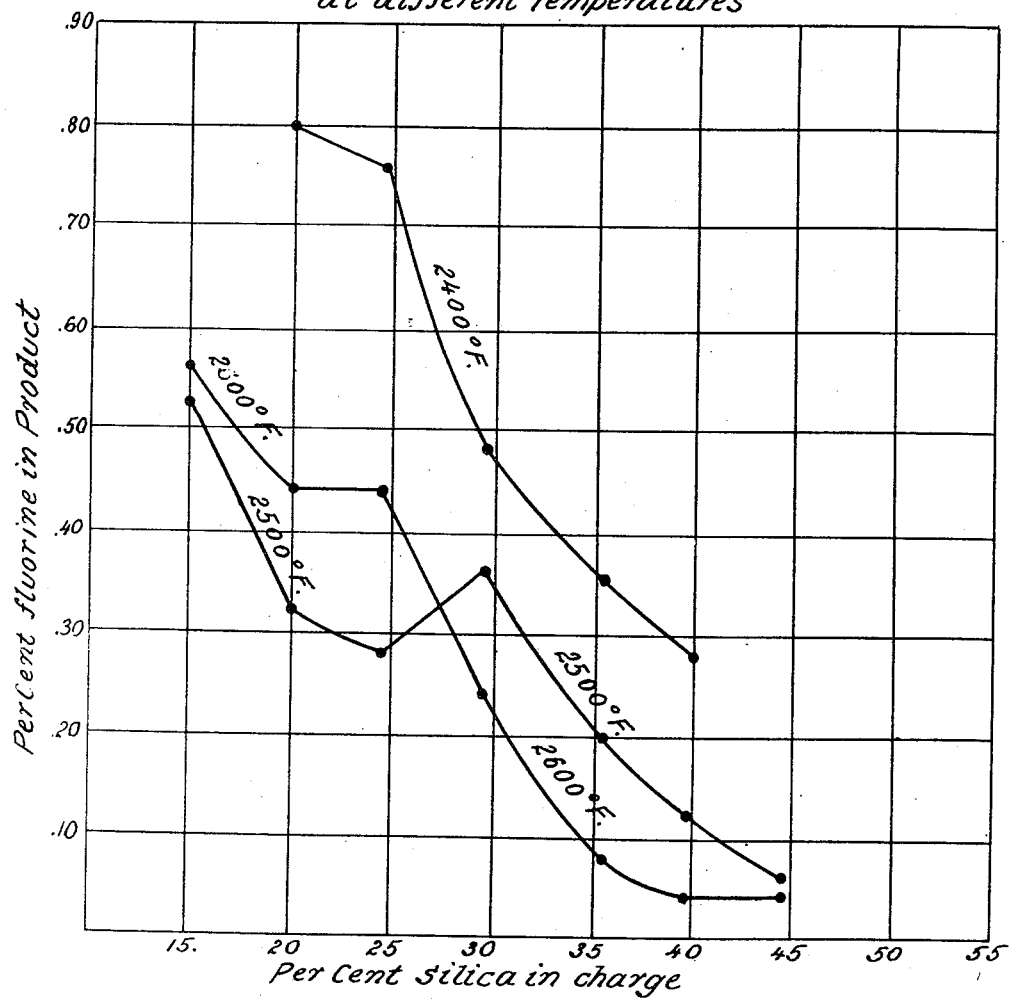

Patented Aug. 10, 1948

2,446,978

UNITED STATES PATENT OFFICE 2,446,978

DEFLUORINATION OF PHOSPHATE ROCK

Ernest J. Maust, Lakeland, Fla., assignor to Coronet Phosphate Company, New York, N. Y., a corporation of New York Application April 8, 1944, Serial No. 530,156

9 Claims. (Cl. 71—47)

This invention relates to the defluorination of phosphate rock by calcination in the presence of silica and water vapor, and has for its objects the provision of certain improvements in that process and the provision, as a new article of commerce, of an improved phosphatic product of very low fluorine content.

Fluorine is present in practically all native phosphate rock, in amount varying in the different areas in which it occurs. The common Florida phosphate rock (e. g. pebble rock) usually contains from 3.5 to 4% of fluorine, around 75% bone phosphate of lime (B. P. L.), around 5% silica, around 5% calcium carbonate, around 2% iron and aluminum oxides, and the balance organic matter and other impurities. The fluorine is commonly believed to be present as calcium fluoride and also combined with the tricalcium phosphate as calcium fluorphosphate or fluorapatite ($Ca_{10}F_2(PO_4)_6$), and this combination is believed to be largely responsible for the low fertilizer efficiency of the raw rock (or concentrate), as evidenced by the customary ammonium citrate solubility test. Moreover, the high fluorine content of the raw rock makes it unsuitable as an animal feed or mineral supplement. Consequently, many proposals have heretofore been advanced, with varying degrees of success, for defluorinating phosphate-bearing products.

The most common form of phosphate used in the fertilizer field is the so-called superphosphate. This phosphate-bearing material is customarily made by acidulating finely ground phosphate rock containing from 58% to 86% tricalcium phosphate with sulphuric acid in concentrations of from 50° to 60° Bé. The product resulting from this treatment consists largely of monocalcium phosphate and gypsum. The monocalcium phosphate contained in this product provides from 15 to 23% of phosphorus pentoxide ($P_2O_5$) which is readily available as plant fertilizer. Such superphosphate, however, generally contains over 1% and sometimes as much as 2% fluorine. The fluorine content in excess of about 0.3%, or over 1 part of fluorine per 30 parts of phosphorus makes it unsuitable for use as a mineral supplement. Fluorine, however, can be eliminated from superphosphate to produce a satisfactory product for use as a mineral supplement by a further step of simple calcination.

Defluorination of the raw phosphate rock to make it available as a plant food or fertilizer and suitable as a mineral supplement in animal feed has engaged the attention of phosphate producers for many years. In recent times the matter has assumed particular importance due to the shortage of bone meal as a mineral supplement and a shortage of sulphuric acid for the production of superphosphate. Among the many proposals for defluorinating phosphate rock, the calcination process in the presence of silica and water vapor has appeared the most promising and a vast amount of work has been done in the endeavor to commercialize that process. The United States Department of Agriculture has fully reported its investigations on the action of silica and water vapor in defluorinating phosphate rock (Industrial and Engineering Chemistry, April 1934, pages 406–412), and many attempts have been made to translate the reported results of these investigations into commercial processes. However, so far as I am aware, no one has heretofore succeeded in effecting on a commercial scale substantially complete defluorination of phosphate rock by calcination in the presence of silica and water vapor without sintering or fusing the charge, an objectionable and unfavorable condition in commercial practice. Thus, it has been found that within the practical working range of temperatures in rotary kilns fusion of the charge takes place, with the production of a sticky mass that makes continuous operation impossible. Fusion also prevents access of the water vapor to the charge, with the result that an incompletely defluorinated product is obtained.

Simple calcination at temperatures around 2400° F. will remove a large proportion of the fluorine from ordinary raw phosphate rock. However, the removal from phosphate rock of that proportion of its total fluorine content readily eliminated by calcination does not greatly or correspondingly increase the citrate solubility (available $P_2O_5$) of the calcined product, and it is not until the fluorine content is reduced to below 0.5% that the citrate solubility is markedly increased. Consequently, the problem which has confronted the industry in defluorinating raw phosphate rock by calcination is the elimination of such a proportion of that difficultly-removable and relatively small fluorine content as will bring about a worth-while and economic increase in the citrate solubility or available $P_2O_5$ of the final product.

As the result of an exhaustive investigation of the subject I have confirmed the conclusions of other laboratory investigators with respect to the desirability of carrying out the calcination in the presence of a relative high amount of silica (around 25%) and an adequate concentration of water vapor. But upon attempting to reproduce laboratory practices on even a semi-commercial scale, eratic, unsatisfactory and commercially impractical results were obtained. However, in the course of my laboratory investigations and semi-commercial operations, I made certain discoveries the application of which enable me to carry out economically on a commercial scale substantially complete defluorination of raw phosphate rock. For example, I have discovered that the elimination of the difficultly-removable fluorine requires the presence, intimately mixed with finely divided phosphate rock, of from 35 to 45% of finely divided silica, and calcining temperatures from 2600 to 3000° F. I have further discovered that the calcination should be so conducted that the charge does not sinter or fuse, since sintering and especially fusion impedes and actually inhibits continuous operation, and also locks the fluorine in the charge and makes its elimination practically impossible at temperatures below 3000° F. I have also discovered that fluorine, in whatever form or compound it is evolved in calcination, does not attack the refractories customarily used in lining the calcining apparatus so long as the refractories and evolved fluorine are dry, but destructive attack occurs if moisture is present. Water vapor at the contemplated calcining temperatures is dry and gives no corrosion trouble. In the latter connection, I have discovered, contrary to the general belief, that the fluorine is not evolved in any combination with silica, and that the action of the silica is mainly mechanical to keep the particles of rock separated and thereby prevent their fusion and consequent failure of intimate contact with water vapor.

I have further discovered that the mere presence of water vapor in the calcining apparatus does not assure the contemplated action and that intimate and continuous association of the water vapor with the entire body of the charge and until calcination is completed is necessary. While the amount or concentration of water vapor in the gaseous atmosphere about the charge does not appear to be critical, I have found that it is essential that some water vapor be in contact with all parts of the charge until calcination is completed. Several factors mitigate against such contact of the water vapor with the charge. Thus, water vapor is consumed during calcination by its reaction with fluorine to form hydrofluoric acid gas, thus depleting, and even reducing to zero, the concentration of water vapor in the gaseous atmosphere in contact with the charge. Furthermore, the evolved hydrofluoric acid gas not only tends to envelop uncalcined parts of the charge but in escaping from the charge flows countercurrently to the water vapor necessary for replacing that consumed, and thereby impedes penetration of fresh water vapor throughout the charge. Accordingly, I have found that positive and continuous penetration of water vapor throughout the body of the charge is essential for substantially complete defluorination.

Based on the foregoing discoveries, the present invention involves, in its broad aspect, a combination of steps comprising generally intimately mixing finely ground phosphate rock and finely ground silica with the amount of silica (at least 35%) in excess of that heretofore generally considered useful, heating this mixture (calcining charge) at temperatures (at least 2600° F.) in excess of those heretofore generally considered practical without substantial sintering or fusion, and bringing water vapor into positive and continuous contact with all parts of the charge, and hence with all particles of the rock, during the entire period that the charge is undergoing calcination. Thus, there is provided about the charge a gaseous atmosphere containing water vapor under conditions assuring positive penetration of water vapor throughout the body of the charge, and in contact with all uncalcined particles of the finely divided phosphate rock in the charge, during the entire period of calcination. Among various other practical expedients, such conditions may be advantageously maintained, particularly in a rotary kiln, by providing in the gaseous atmosphere about the charge a sufficient concentration of water vapor to penetrate the entire body of charge, and maintaining the gaseous atmosphere about the charge at a pressure slightly above atmospheric pressure, say, for example, from ⅛ to ¼ inch of water. The phosphate rock and silica are preferably crushed and ground so that at least 75% of each passes through a 200 mesh standard Tyler screen, and substantially all passes through a 65 mesh screen. The finely divided silica is intimately distributed throughout the finely divided rock, and the charge prepared for calcination contains from 35 to 45% of silica by weight. The calcining temperature is 2600° F., but not so high that substantial sintering or fusion takes place. Temperatures from 2600° F. to 3000° F. are generally suitable, and excellent results have been obtained with a calcining temperature of approximately 2700° F. The duration of heat treatment will vary with the calcining temperature, being from 5 to 20 minutes at 2700° F. and higher, and around 30 minutes at 2600° F.

A further novel and advantageous feature of the invention is the improved defluorinated phosphate product obtained by practicing the method of the invention. This product consists of finely divided phosphate-bearing material, for the most part in the form of tricalcium phosphate, intimately intermixed with from 25 to 50% (based on the weight of the product) of finely divided insoluble matter, for the most part silica in the form of cristobalite. The product contains not over 1 part of fluorine per 30 parts of phosphorus, and at least 85% of its total $P_2O_5$ content is available as a plant food. Cristobalite is an amorphous state of silica, having a specific gravity of 2.32 and a fusion temperature of 3120° F. It is formed by heating quartz (the customary crystalline state of silica having a specific gravity of 2.65 and a fusion temperature of 2678° F.) at a temperature of 2678° F., from which temperature up to its melting temperature cristobalite is stable. The cristobalite may be preserved by quick cooling or quenching. In the method of the invention, natural or untreated silica is initially present in the calcining charge as quartz, and it seems probable that its conversion to cristobalite is initiated at a temperature lower than 2678° F. and is promoted by the catalytic action of hydrofluoric acid gas (resulting from the reaction between water vapor and the fluorine content of the rock) upon the silica in the calcining charge. No chemical change involving silica is believed to take place in the method of the invention, and in particular no evidence has been detected of any chemical combination between the silica and tricalcium phosphate. Moreover, it has been established that the silica is not attacked by the hydrofluoric acid gas under the prevailing conditions of the method of the invention. A typical analysis of the gases evolved from the calcining charge during the defluorinating method of the invention is as follows:

| | Percent |
|---|---|
| Fluorine (as hydrofluoric acid) | 98.3 |
| Phosphorus pentoxide | 0.9 |
| Silica | 0.8 |

The foregoing and other novel features of the invention will be best understood from the following description taken in conjunction with the accompanying drawings, in which Fig. 1 is a diagrammatic flow sheet of the practice of the method of the invention with a rotary kiln for calcination, Fig. 2 is a similar diagrammatic flow sheet in which the calcination is carried out in a shaft furnace, Fig. 3 is another diagrammatic flow sheet in which the calcination is conducted on a sintering machine, and Figs. 4, 5, 6 and 7 are explanatory curves of silica, fluorine and temperature relationships.

As hereinbefore mentioned, I have discovered that the action of the silica is mainly mechanical, and not chemical as heretofore generally supposed. Thus, I have found that one of the important functions of the silica is to provide a multitude of points of contact between the phosphate rock and the silica, thus minimizing contact of the phosphate rock particles with one another and thereby avoiding their fusion and sticking together. The silica, in this respect, acts as a mechanical separator to keep the phosphate rock particles apart. Such separation of the rock particles not only prevents their fusion and sticking together in masses difficultly penetrable by water vapor, but facilitates access of water vapor to all of the rock particles and hence promotes penetration of water vapor throughout the entire body of the charge. Furthermore, the particles of silica are similarly separated from one another by the phosphate rock particles, and the hydrofluoric acid produced by the reaction between the fluorine in the rock particles and water vapor, in conjunction with the high temperature of calcination, establishes the conditions necessary to produce the change of state of the silica from quartz to cristobalite. To meet these conditions the calcining charge must include a relatively large amount of silica, and both the silica and phosphate rock must be finely divided. In addition to its mechanical action as a separator, there is the possibility that the silica exercises some catalytic action in promoting the elimination of the fluorine bound in fluorapatite.

I have found that the calcining charge should contain from 35 to 45%, of finely divided silica, as quartz or free silica. No more silica than necessary is included in the charge, since silica adds no value to the final phosphate product, but, on the contrary, is generally a diluent thereof. I have found little, if any, advantage in increasing the silica content of the charge above about 45%, since with this amount of silica substantially complete removal of fluorine may be obtained at temperatures and with periods of calcination readily established in rotary kilns of the kind used in the cement industry, as well as in other types of calcining apparatus, in conjunction, of course, with the necessary penetration of water vapor throughout the charge as hereinafter described. The relatively high silica content of the calcining charge has the further advantage of permitting higher calcining temperatures than would otherwise be possible without substantial sintering or fusion of the charge. The advantage of higher calcining temperatures, that is from 2600 to 3000° F., is that the rate of fluorine removal is more rapid at higher temperatures, and thus the duration or time of the heat treatment (calcination) is decreased.

Approximately one-half of the fluorine content of the relatively high-silica phosphate rock mixture can be removed by heating in the absence of water vapor at temperatures below 2500° F. Such an incompletely defluorinated product has no commercial value. Substantially complete removal of the fluorine, under favorable conditions of water vapor penetration, cannot be attained at temperatures under 2400° F. with a heat treatment period as long as 40 minutes, which is unduly long for economic commercial practice in a rotary kiln. In practicing the invention, it is preferred to have water vapor present even during the early stages of fluorine removal, so that hydrofluoric acid will be formed and will exercise its catalytic action in the conversion of the silica from quartz to cristobalite in the early stages of the calcination. This change in state of the silica as well as the removal of fluorine starts to take place when a temperature around 1600° F. is reached. This change in state of the silica is of special advantage since thereby the fusion temperature of the silica in the charge is increased from that of quartz (below 2678° F.) to that of cristobalite (3120° F.), thus permitting the use of the relatively high calcining temperatures contemplated by the invention without fusion of the charge.

Figs. 4, 5, 6 and 7 of the drawings illustrate certain of the features hereinbefore discussed. The curves represent laboratory results, in which the calcining charge was heated in an electric furnace with water vapor passing through or in intimate contact with the charge. In carrying out the tests upon which these curves are based, the reaction tube of the furnace was initially heated slightly above the tempreature at which it was desired to heat the charge, the water vapor in sufficient volume was passed through the tube. The charge was then gradually introduced into the tube and promptly heated to and maintained at the desired temperature in the presence of water vapor for the desired interval of heat treatment. The calcining or heat treatment temperature is shown on each curve. The ordinates, in all figures, represent the fluorine (in percent) remaining in the charge after the heat treatment. The abscissae (Figs. 4, 5 and 6) represent the duration (in minutes) of the heat treatment, and in Fig. 7, the abscissae represent the percent of silica in the charge. The calcining charges of Figs. 4, 5 and 6 included the following percentages of silica and tricalcium phosphate (B. P. L.):

| | Per cent |
|---|---|
| Fig. 4: Silica | 44.00 |
| B. P. L. | 44.88 |
| Fig. 5: Silica | 35.48 |
| B. P. L. | 51.52 |
| Fig. 6: Silica | 24.06 |
| B. P. L. | 61.21 |

The balance of the calcining charges (100%) was made up of the constituents of the phosphate rock other than tricalcium phosphate.

Figs. 4 and 5 represent laboratory operations conducted under the prescribed conditions of the invention, while Fig. 6 represents a laboratory operation in which the silica content is lower than the prescribed condition of the invention.

In each figure, the calcining temperature of 2400° F. is seen to be too low to effect satisfactory defluorination in any practical period of heat treatment in a rotary kiln. In commercial practice, in a rotary kiln, the period of heat treatment should not, for economic reasons, exceed about 30 minutes, and preferably should not exceed 20 minutes. In Fig. 4 (with 44% SiO₂), calcining temperatures of 2600° F. and 2700° F. give excellen defluorination with heat treatments of 20 minutes. In Fig. 5 (with 35.48% SiO₂), a calcining temperature of 2600° F. gives satisfactory results with a heat treatment of 20 minutes, while a calcining temperature of 2500° F. requires a substantially longer time of heat treatment to effect the same defluorination. A calcining temperature of 2700° F. is too high for this charge (35.48% SiO₂) because it causes such stickiness or fusion of the charge as to prevent continuous operation (e. g. in a rotary kiln).

The approximate temperature at which fusion or stickiness of the charge begins is indicated on the curves of Figs. 4, 5 and 6 by a high temperature curve crossing a low temperature curve. Thus in Fig. 5, the 2700° F. curve crosses the 2600° F. curve, and this indicates that fusion starts to take place below 2700° F. A calcining temperature of 2700° F. causes such fusion of this particular charge that for more than the first fifteen minutes of the heat-treatment period the rate of fluorine elimination is greater at the lower calcining temperature of 2600° F. Although Fig. 5 indicates a slightly better final fluorine elimination at 2700° F. than at 2600° F. during a 20 minute period of heat treatment, the fusion and consequent stickiness of the charge at 2700° F. would seriously interfere with, if not render impracticable, commercial treatment of this charge at 2700° F. in a rotary kiln.

The curves of Fig. 6 indicate that fusion of this charge (24.06% SiO₂) begins below 2600° F., since the curve of this temperature crosses the 2500° F. curve. Due to fusion, fluorine elimination at 2600° F. is not satisfactory, while at 2500° F. the period of heat treatment is unduly long. In other words, with a calcining charge containing as little as 24.06% silica, satisfactory and economic elimination of fluorine, without sintering or fusion of the charge, is impracticable.

The curves of Fig. 7 show the relation between the silica content of the charge and fluorine remaining in the charge after 20 minutes of heat treatment at the indicated temperatures. Here again, it is shown that no practical amount of silica in the charge will give satisfactory results at a temperature of 2400° F. The 2600° F. curve crosses the 2500° F. curve at 27.5% silica, showing that with a charge containing 27.5% silica fusion of the charge begins to take place below 2600° F.

An inspection of the curves of Figs. 4 to 7 shows that the full advantages of the invention are realized when the charge contains 35% or more of silica. With such a charge, the defluorinated product contains progressively lower fluorine at progressively higher calcining temperatures with the same duration of heat treatment, and provided, of course, that the temperature is not so high that fusion takes place.

The phosphate rock and the silica should preferably be ground separately, either dry or as a slurry, and then very intimately mixed to give the contemplated high silica content in the mixture or calcining charge of 35 to 45%. The phosphate rock may, and usually will, contain some free silica, say around 5%, and this should be taken into account in determining the amount of silica or high siliceous material to be added to and mixed with the rock to give the contemplated total silica of the mixture. Both rock and silica should be uniformly ground, preferably so that 75% of each passes through a 200 mesh screen and all passes through a 65 mesh screen. The silica may be derived from any suitable source, such as clean sand or other highly siliceous material that introduces no objectionable contaminant into the phosphate product. Where the defluorination treatment is carried out at or near the phosphate mines, an untreated mixture of phosphate rock and silica, commonly known in the phosphate industry as flotation feed, may be directly employed as the calcining charge, thus eliminating the present customary and costly operation of froth flotation. The contemplated silica content can be obtained by blending a high and a low silica mixture. The siliceous tailings of the customary phosphate flotation processes, or other methods of concentration, may also be used to furnish the necessary added silica. An ideal form of silica is the cristobalite concentrate recoverable in concentrating the phosphate-bearing content of the defluorinated product of the invention by froth flotation or other suitable concentrating process. Being already finely divided, it is immediately available for mixing with finely ground phosphate rock, and being already in the form of cristobalite its fusion temperature is above any contemplated calcining temperature. Silica in the form of cristobalite can thus be continually recycled.

Phosphate rock commercially suitable for the practice of the invention usually contains from 2 to 3% of combined iron and aluminum, ordinarily reported in analyses as the oxides although probably not actually present in the rock as such. Even small amounts of iron and aluminum exercise some deleterious effect upon the calcination of the rock. In any type of defluorinating equipment in which the hot gases come in contact with the cold feed, as for example in a rotary kiln, hydrofluoric acid in the hot gases tends to react with the cold feed at temperatures under 1600° F. to form fluorides. Thus, iron, aluminum and calcium fluorides may, and usually will, be formed in the cold feed while it is being heated up to 1600° F. Aluminum fluoride fuses at a relatively low temperature, and calcium fluoride fuses at a somewhat higher temperature. Unless the low fusion fluorides are broken up and the fluorine released before their respective fusion temperatures are reached, fusion will result, thus locking in some of the fluorine present as fluorapatite and thereby preventing complete defluorination. Hence, the amount of iron and aluminum in the calcining charge should be as low as practicable. When phosphate rock containing 2 to 3% of combined iron and aluminum is mixed with clean sand, in making up the calcining charge of the invention, the percentage of iron and aluminum in the charge is reduced to about 1 to 1.5%, an amount insufficient to deleteriously affect substantially complete defluorination in accordance with the method of the invention.

The method of the invention may be practiced in various types of apparatus, and in Figs. 1, 2 and 3 of the accompanying drawings, three different types of apparatus have been shown merely by way of example and without limitation of the invention thereto. In Fig. 1, the heat treatment or calcination is carried out in a rotary kiln, in Fig. 2, it is carried out in a shaft furnace, and in Fig. 3, it is carried out on a sintering machine. In each case, the phosphate rock and silica are separately ground and delivered to separate storage bins. Appropriate amounts of the finely ground rock and silica are withdrawn as required from the storage bins and intimately dry mixed to make up the calcining charge of the contemplated silica content.

Referring now more particularly to Fig. 1, the calcining charge of finely divided and intimately mixed phosphate rock and silica, with the silica content of the charge from 35 to 45%, is continuously fed in any appropriate manner into the upper or charging end of an inclined rotary kiln. The charge is preferably fed to the kiln in the form of a water slurry containing about 65% solids. Alternately, the charge may be nodulized or agglomerated to approximately ¼ inch nodules or agglomerates before feeding to the kiln. The kiln is fired at its lower end by a flame such as obtained from the burning of gas, fuel oil or powdered coal. A substantial amount of water vapor, preferably in the form of superheated steam, is introduced at the firing end of the kiln. Rotation of the kiln causes the charge to travel from the charging end to the firing end of the kiln, in a continuous manner, and the flame is adjusted and controlled, in co-relation with the speed of rotation of the kiln, to provide a heating zone in the kiln in which the charge is subjected to a temperature of from 2500 to 3000° F. for a sufficient period of time to effect substantially complete defluorination without fusion of the charge. In a rotary kiln this heating is effected by direct contact of the hot products of combustion of the burning fuel with the charge. Where the silica content of the charge is about 35%, the heating zone may advantageously be maintained at a temperature slightly in excess of 2600° F. but lower than 2700° F. for a period of from 20 to 30 minutes. With a silica content of about 45%, the calcining temperature may advantageously be around 2700° F., or somewhat higher, and the heat-treatment period from 10 to 20 minutes.

Penetration of the water vapor throughout the entire body or mass of the charge is essential, not only to promote defluorination but to provide the necessary conditions for the conversion of the silica from quartz to cristobalite. Under the conditions prevailing in a rotary kiln the water vapor is lighter than air, and air is lighter than carbon dioxide. Hence, there is, I believe, a tendency for these three gases to stratify, to some extent, with the carbon dioxide on the bottom and the water vapor on top. The water vapor thus tends to rise toward the top of the kiln and to pass through without effective contact with the charge. In accordance with my present preferred practice, the necessary penetration of the water vapor through the charge is secured by operating the kiln at a pressure slightly above atmospheric pressure, say from ⅛ to ¼ inch of water. In the customary operation of a rotary kiln, the gaseous atmosphere within the kiln is generally at a slightly lower pressure than the atmosphere, due to the stack or other draft pulling the gases through the kiln. Where the kiln has a side door (normally closed) somewhere along its length (say near the charging end), a definite suction, drawing air into the kiln through the door, will be observed when the door is opened with the kiln operating under its customary condition. On the other hand, when the kiln is operating under a slight pressure, as here contemplated, the kiln gases will be forced through the door into the surrounding atmosphere, when the door is opened. The desired slight pressure within the kiln can be obtained by appropriately restricting the gas exit opening at the feed end of the kiln by a depending and adjustable curtain or baffle, thus so restricting or dampening the exit gas flow that water vapor is carried by the flame into direct and positive contact with the charge.

The necessary penetration of the water vapor throughout the charge may be assured by introducing such an excess of water vapor as to displace substantially all excess air. The products of combustion of the burning fuel will contain some water vapor and this in conjuction with the excess introduced at the firing end of the kiln will generally assure positive contact of the water vapor with all parts of the charge.

Another expedient for assuring positive contact of the water vapor with the charge is to provide the interior heating chamber of the kiln with lifters which will raise the charge from the bottom, as the kiln rotates, and cause it to shower back through the gaseous atmosphere of the kiln onto the bottom of the kiln. Still another expedient is to so increase the speed of rotation of the kiln as to carry the charge upward to near the top of the kiln, in which case the charge is brought upwardly into any concentrated strata of water vapor at the top of the kiln and showered therethrough to some extent.

The defluorinated phosphate product is discharged from the kiln at the firing end. The product must be discharged while still red hot and cooled rapidly in any suitable type of cooler. Rapid cooling of the product is necessary to prevent the tricalcium phosphate in the product reverting from its alpha form back to its original beta form. The red hot discharged product may, for example, be sprayed with water and the resulting water vapor superheated and introduced into the firing end of the kiln to supply part, or perhaps all, of the required water vapor. The cooled product is, for the most part, in the form of small friable nodules, say from ⅛ to ½ inch in diameter, possessing a very high degree of porosity due to the multitude of pore spaces resulting from the release of the fluorine. The cooled product is appropriately ground to any desired fineness and may be directly marketed.

The exhaust gaseous products of the calcining operation, including the hydrofluoric acid gas formed in the course of the defluorination, are discharged from the upper or feed end of the kiln and pass first through an appropriate dust collector. The dust recovered in the collector may advantageously be returned to the stage of mixing phosphate rock with silica. The dust-free gases next pass through a scrubber where water removes the hydrofluoric acid gas for subsequent treatment as a by-product of the operation. The gases from the scrubber may be exhausted to the atmosphere.

The practice of the method of the invention in the shaft furnace shown in Fig. 2 is in principle substantially the same as hereinbefore described in connection with the rotary kiln of Fig. 1. The calcining charge of finely divided and intimately mixed phosphate rock and silica is nodulized or agglomerated and fed to the shaft furnace near the top. The finely divided charge mixture may be nodulized or agglomerated in any appropriate manner to form small nodules or agglomerates, say from ¼ to ¾ inch in diameter, of sufficient strength to progress downwardly through the shaft furnace without crumbling or crushing to such an extent as to impair the porosity of the charge undergoing heat treatment in the shaft furnace. The finely divided charge mixture may, for example, be briquetted with the aid of a suitable binder, such as sodium silicate or water glass. Suitable nodules may also be obtained by appropriately sintering the finely divided charge mixture.

Water vapor is introduced into the shaft furnace at a level somewhat above its bottom and the flame or hot products of combustion of burning fuel are introduced into the furnace at a level sightly above that at which the water vapor is introduced. The charge is defluorinated by the time it reaches the level of heating gas introduction, and from this level to the level of water vapor introduction the charge is rapidly cooled by the ascending water vapor, and at the same time the water vapor is superheated. The defluorinated product is withdrawn from the bottom of the shaft furnace, as for example, by a drag conveyor, and ground as hereinbefore described.

The shaft furnace is operated in a continuous manner, nodules of the calcining charge being continuously fed to the top of the furnace and the defluorinated product being continuously withdrawn from the bottom of the furnace. The heating gases and water vapor penetrate all parts of the charge in the heating zone of the furnace due to the porosity resulting from the nodulized form of the charge. The time of passage of the nodulized charge through the heating zone of the shaft furnace is correlated with the silica content of the charge and the controlled temperature within the heating zone to effect substantially complete defluorination of the charge by the time it reaches the level at which the heating gases are introduced.

Fig. 3 of the drawings diagrammatically illustrates the use of a sintering machine for calcining the finely divided and intimately mixed charge of phosphate rock and silica. The charge is preferably given a preliminary nodulizing or agglomerating treatment as described in connection with Fig. 2, and the resulting nodules or agglomerates are continuously fed to one end of the sintering machine. The flame or hot products of combustion of burning fuel together with water vapor are drawn downwardly through the nodulized charge by an exhaust blower (preferably interposed between the dust collector and the scrubber), intimate contact of the water vapor with all parts of the charge being thus assured. The rate of travel of the perforated grate of the sintering machine is correlated with the silica content of the charge and the controlled temperature of heat treatment to effect substantially complete defluorination without fusing the charge. In other respects the calcining operation on the sintering machine is substantially the same as described in connection with the rotary kiln of Fig. 1.

Reverting again to the necessity of bringing the water vapor into positive and continuous contact with all particles of the finely divided phosphate rock in the charge until substantially complete defluorination is effected, it should be noted that in calcining apparatus, like the shaft furnace and the sintering machine, where the heating gases and water vapor are forced or drawn through the entire body of the porous charge, intimate and positive contact between the rock particles and water vapor is assured, and consumed water vapor is constantly replaced by fresh water vapor and evolved hydrofluoric acid gas is promptly removed from the point of its formation by the gas stream. While the pressure of the gaseous atmosphere about the charge in such apparatus will probably be slightly above atmospheric pressure, reliance on such pressure is not necessary to assure the required continued contact between the rock particles and the water vapor, since the passage of the gases themselves through the charge inherently maintains the required continued contact of water vapor with the rock particles. On the other hand, in a rotary kiln and similar types of calcining apparatus, the charge is heated in large part by radiation and conduction, rather than by direct contact with the heating gases, and positive expedients must be provided, such as operating under pressure, to insure contact of water vapor with all rock particles of the charge until defluorination is completed. In all cases and in all types of apparatus, water vapor must be brought into and continued in reactive contact with all of the rock particles until substantially complete defluorination of the charge as a whole has been completed.

Substantial sintering or fusion of the calcining charge is to be considered as sintering or fusion to such an extent that the charge becomes sticky, in whole or in part, and tends to cling or stick to the wall of the calcining apparatus, and, in a rotary kiln, fails to flow freely and easily through the kiln. Fusion may also be defined as a condition where for a given time period of treatment a higher fluorine content results than from treating for the same time period at a lower temperature. Substantial sintering or fusion prevents substantially complete defluorination at temperatures lower than 3000° F.

While it does not now appear that silica in the form of cristobalite contributes beneficially to the properties of the product for its present customary uses, its formation during calcination does contribute very substantially to successful commercial practice of the method of the invention. As ordinary quartz (alpha-quartz) is heated, its form changes with increasing temperature to beta-quartz, tridymite and cristobalite. At temperatures from 2678° F. to 3120° F. (at which it melts), cristobalite is stable, the complete change from tridymite to cristobalite taking place at 2678° F. (the melting temperature of quartz). The quick cooling of the calcined product, hereinbefore described, preserves the cristobalite form of the silica in the cooled defluorinated phosphate product. Thus, at no temperature contemplated in the practice of the invention does the silica content of the calcining charge tend to fuse or melt, and the large amount of silica present in the charge is therefore an ideal medium for maintaining the finely divided particles of phosphate rock separated or isolated and out of effective physical contact with one another. On this account, the more finely divided is the silica the more effective it is as a separating medium. Conversely, the amount of silica included in the charge may be somewhat reduced by more finely grinding it, although practical economic considerations limit the fineness to which the silica can be ground in commercial practice. In addition to its function as a separating medium, it is likely that the silica provides a multitude of solid surfaces in the charge over which any melted or fused particles of rock spread and are held by surface tension, and thereby prevented from running together to form fused masses of rock.

In the phosphate industry, silica is customarily determined as "insoluble matter" in one part of concentrated hydrochloric acid and one part of water at boiling temperature. The insoluble matter will consist for the most part of silica but may, and usually will, contain a relatively small amount of other insoluble substances. So far as the practice of the present invention is concerned, these other insoluble substances are unobjectionable and probably act in much the same manner as silica. Since in commercial practice, determinations of insoluble matter are more usual and more readily made than determinations of silica, it is generally more convenient, in practicing the invention, to consider the insoluble matter as the equivalent of silica, and to include in the calcining charge the contemplated amount of silica in the form of insoluble matter.

Where the calcining charge is nodulized or agglomerated, I have found it of advantage to include a pore-forming agent in the charge in order to insure adequate porosity of the nodules or agglomerates. Finely ground sawdust is a suitable pore-forming agent, and up to 5% by weight may be included in the charge. It is preferable to add the sawdust, or other suitable pore-forming agent, to one of the grinding mills in which the rock or silica is ground, so that it will be correspondingly finely ground.

Instead of removing the hydrofluoric acid gas from the exhaust gases of the calcining operation by scrubbing with water, these gases may be brought into contact with a finely divided compound of a metallic element capable of combining with fluorine to form a fluoride of the metallic element, such, for example, as finely divided bauxite or aluminum oxide, calcium oxide, calcium carbonate, magnesium oxide, magnesium carbonate, rutile or titanium oxide, sodium chloride, and sodium carbonate. At temperatures below those at which the respective fluorides evolve fluorine and above the dew point, approximately 212° F., the hydrofluoric acid gas will react with such finely divided compounds to form the fluoride of aluminum, calcium, magnesium, titanium, sodium, etc., corresponding to the metallic element of the finely divided compound. For example, the exhaust gases, freed of dust and suitably cooled if necessary, may be passed through a fluosolid chamber, or equivalent device for intimately contacting a finely divided solid with a gas, where the hydrofluoric acid gas contacts and reacts with finely divided lime (CaO) or limestone ($CaCO_3$) at a temperature below 1600° F. but above the dew point, thereby forming calcium fluoride, which may be used as the starting or raw material in the production of various fluorine products. In this manner the fluorine eliminated during calcination is converted to a more valuable by-product than hydrofluoric acid.

Present day phosphate products of acceptable $P_2O_5$ content are considered satisfactorily and substantially defluorinated when the ratio of fluorine to phosphorus is not greater than 1 to 30, and when the fluorine content of the product is that low and its phosphate-bearing material is in the form of tricalcium phosphate, at least 85% of its phosphorus or $P_2O_5$ content will be available as a plant food as determined by the neutral ammonium citrate solubility test. Accordingly, throughout this specification and the appended claims defluorination is to be considered substantially complete when at least 85% of the total $P_2O_5$ in the defluorinated product is available as a plant food, or, alternately, when the ratio of fluorine to phosphorus does not exceed 1 to 30.

The substantially completely defluorinated phosphate rock product of the invention contains about 18% or more (based on the weight of the product) of phosphorus determined as $P_2O_5$, of which at least 85%, and usually 90% or more, is available as a plant food as determined by the neutral ammonium citrate solubility method, and its fluorine content is not more than 1 part per 30 parts of phosphorus. A relatively high percent, usually 95% or more, of its $P_2O_5$ content is available as a mineral supplement using the 0.1 normal hydrochloric acid method of determination. Where the insoluble matter (mostly cristobalite) in the product is as high as 50%, the fluorine in the product will usually not exceed 0.2% and generally will be under 0.1%. Generally speaking, the actual percentage of fluorine present may be higher in products containing lower percentages of insoluble matter, but the latter products will contain higher percentages of phosphate-bearing material, and the ratio of fluorine to phosphorus will hence not exceed 1 to 30. The product of the invention, in spite of its added silica content, contains substantially the same (and in some cases a greater) percentage of available $P_2O_5$ as does superphosphate for use as a plant food, or as does defluorinated superphosphate for use as a mineral supplement. Moreover, the product of the invention may be used equally well as either a plant food or as a mineral supplement, whereas superphosphate is not suitable for use as a mineral supplement because of its relatively high fluorine content, and defluorinated superphosphate is not suitable as a plant food because in defluorinating a large part of its $P_2O_5$ content is rendered unavailable as a plant food.

The percent of available $P_2O_5$ in any product of the invention may be readily increased by removing a corresponding percentage of the silica (cristobalite). This may be done by any of the now well known practices of phosphate concentration such as froth flotation, gravity concentration, etc. By such concentration, a very high grade tricalcium phosphate product (containing up to 40% $P_2O_5$) can be obtained, and at the same time a product high in finely divided cristobalite can be obtained for mixing with finely divided raw phosphate rock to make up a fresh calcining charge. Where the cristobalite is thus recycled, it is advantageous that the phosphate rock and silica be ground so that 95% passes through a 200 mesh screen, since when so finely divided the tricalcium phosphate and cristobalite in the defluorinated product will consist for the most part of separate and discrete particles of each, thus facilitating their separation and recovery by customary methods of concentration.

The product of the invention is non-hydroscopic, thereby assuring ease of mixing with other fertilizer ingredients and in putting on the soil. Furthermore it is non-acid. Substantially all of the phosphorus in the new product is present as water-insoluble tricalcium phosphate, whereas in superphosphate the phosphorus is largely present as water-soluble monocalcium phosphate. Hence, the fertilizer value of the new product enters the soil more gradually than in the case of superphosphate and hence is not carried away so rapidly by rain water.

The following is the analysis of a defluorinated phosphate product produced by the practice of the invention in a rotary kiln with a calcining charge containing 44% silica determined as insoluble matter; the silica reported in the analysis being similarly determined:

| | Percent |
|---|---|
| $P_2O_5$ | 20.04 |
| $SiO_2$ | 49.92 |
| $F_2$ | 0.08 |
| CaO | 27.34 |
| $Fe_2O_3$ | 0.66 |
| $Al_2O_3$ | 0.37 |

Defluorinated phosphate rock products containing as little as 0.01% fluorine, and about 50% insoluble matter for the most part cristobalite have been produced by the practice of the invention in a rotary kiln. A weight loss of approximately 10% occurs during the defluorination due to the volatilization of fluorine, carbon dioxide, sulfur trioxide and organic matter which accounts for the larger silica content of the defluorinated product as compared with the calcining charge.

The calcining charge was fed to the kiln in the form of a water slurry. It is inadvisable to feed the charge dry to a rotary kiln, or similar calcining apparatus, since the dry, finely divided charge coheres near the cold or feed end of the kiln into a soft, friable and porous mass which sticks to the wall of the kiln in the form of a ring. The ring builds up until it breaks off the kiln wall in large chunks which travel through the kiln without substantial disintegration and without satisfactory defluorination due to the difficulty of effecting the necessary penetration of water vapor throughout the mass of the chunks. This cohesion of the dry, finely divided charge is probably due to the presence in the charge of minute amounts of rare-element fluorides fusing at low temperatures, as well as the formation in the cold end of the kiln of low fusing point fluorides by the reaction of hydrofluoric acid gas on the fluorine in the charge as hereinbefore mentioned. In combination these fluorides may, and usually do, fuse at a lower temperature than any one of the fluorides by itself. When the dry charge is nodulized or agglomerated, objectionable cohesion does not take place, and the nodules or agglomerates pass freely through the kiln. When the charge is fed as a water slurry, the water is evaporated and the charge as it dries forms small pellets or nodules that pass freely through the kiln. Instead of forming the charge into a slurry outside the kiln, water may be sprayed on the dry charge inside the kiln at the cold or feed end. Since all the water of the slurry, as well as that sprayed on the charge, is driven off before the charge is heated to the temperature of defluorination, and the resulting water vapor leaves the kiln at the cold end with the exhaust gases, no part of this water is available to supply water vapor for defluorination in the hot or calcining zone of the kiln. When the calcining charge is fed to the rotary kiln in the form of a water slurry, or in the form of nodules, no fusion results and the kiln can be continuously and interruptedly operated. The defluorinated product discharges freely from the kiln in the form of greenish-white pellets or nodules, for the greater part smaller than one-half inch in diameter. The pellets or nodules are characterized by a high degree of porosity, are very friable and can be easily ground to any desired degree of fineness.

I claim:

1. In defluorinating phosphate rock by calcination in the presence of water vapor where the rock is finely divided and finely divided silica is included in the calcining charge in intimate association with the rock, the improvement which comprises including in the calcining charge at least 35% by weight of finely divided silica and calcining the charge at a temperature of at least 2600° F. in the absence of substantial sintering and fusion, and flowing a gaseous atmosphere containing a substantial amount of water vapor into positive and continuous contact with the charge under such conditions that substantially all of the particles of said charge are contacted by said water vapor during the entire period of calcination.

2. In defluorinating phosphate rock by calcination in the presence of water vapor where the rock is finely divided and finely divided silica is included in the calcining charge in intimate association with the rock, the improvement which comprises including in the calcining charge from 35 to 45% by weight of finely divided silica and calcining the charge at a temperature of from 2600 to 3000° F. in the absence of substantial sintering and fusion, and flowing a gaseous atmosphere containing a substantial amount of water vapor into positive and continuous contact with the charge under such conditions that substantially all of the particles of said charge are contacted by said water vapor during the entire period of calcination whereby substantially complete defluorination of the charge is effected and the silica is for the most part converted to cristobalite.

3. In defluorinating phosphate rock by calcination in the presence of water vapor where the rock is finely divided and finely divided silica is included in the calcining charge in intimate association with the rock, the improvement which comprises including in the calcining charge about 45% by weight of finely divided silica and passing the charge in a substantially continuous manner through a calcining zone where the charge is heated to a temperature of from 2700 to 3000° F. in the absence of substantial sintering and fusion, and flowing a gaseous atmosphere containing a substantial amount of water vapor into positive and continuous contact with the charge under such conditions that substantially all of the particles of said charge are contacted by said water vapor during the entre period of calcination whereby substantially complete defluorination is effected and the silica is for the most part converted to cristobalite with a retention period of the charge in said calcining zone of not over 20 minutes.

4. In defluorinating phosphate rock by calcination in the presence of water vapor where the rock is finely divided and finely divided silica is included in the calcining charge in intimate association with the rock, the improvement which comprises including in the calcining charge at least 35% by weight of finely divided silica and passing the charge in a substantially continuous manner through the calcining zone of a rotary kiln and there heating the charge to a temperature of at least 2600° F. in the absence of substantial sintering and fusion, and flowing a gaseous atmosphere containing a substantial amount of water vapor into positive and continuous contact with the charge under such conditions that substantially all of the particles of said charge are contacted by said water vapor during the entire period of calcination.

5. In defluorinating phosphate rock by calcination in a rotary kiln in the presence of water vapor where the rock is finely divided and finely divided silica is included in the calcining charge in intimate association with the rock, the improvement which comprises including in the calcining charge at least 35% by weight of finely divided silica and calcining the charge at a temperature of from 2600 to 3000° F. in the absence of substantial sintering and fusion, providing about the charge a gaseous atmosphere containing water vapor, and maintaining said gaseous atmosphere in positive and continuous contact with the charge during the entire period of calcination by restricting the exit gas flow from the kiln whereby substantially complete defluorination is effected with a retention period of the charge at said calcining temperature of not more than 30 minutes.

6. In defluorinating phosphate rock by calcination in the presence of water vapor where the rock is finely divided and finely divided silica is included in the calcining charge in intimate association with the rock, the improvement which comprises including in the calcining charge about 45% by weight of finely divided silica and passing the charge in a substantially continuous manner through the calcining zone of a rotary kiln where the charge is heated to a temperature of at least 2700° F. in the absence of substantial sintering and fusion, and flowing a gaseous atmosphere containing a substantial amount of water vapor into positive and continuous contact with the charge under such conditions that substantially all of the particles of said charge are contacted by said water vapor during the entire period of calcination whereby substantially complete defluorination is effected with a retention period of the charge in said calcining zone of not more than 20 minutes.

7. In defluorinating phosphate rock by calcination in the presence of silica and water vapor where the rock is finely divided and finely divided silica is included in the calcining charge in intimate association with the rock, the improvement which comprises including in the calcining charge at least 35% by weight of finely divided silica and introducing the charge in the form of a water slurry into the cold end of a rotary kiln where in the course of its passage through the kiln the water is evaporated and the charge is pelletized and then heated to a temperature of at least 2600° F. in the absence of substantial sintering and fusion, and flowing a gaseous atmosphere containing a substantial amount of water vapor into positive and continuous contact with the charge under such conditions that substantially all of the particles of said charge are contacted by said water vapor during the entire period of calcination whereby the fluorine content of the phosphate rock is reduced to not more than one part of fluorine per thirty parts of phosphorus.

8. In defluorinatng phosphate rock by calcination in the presence of water vapor where the rock is finely divided and finely divided silica is included in the calcining charge in intimate association with the rock, the improvement which comprises including in the calcining charge from 35 to 45% by weight of finely divided silica and calcining the charge at a temperature of from 2700 to 3000° F. in the absence of substantial sintering and fusion, flowing a gaseous atmosphere containing a substantial amount of water vapor into positive and continuous contact with the charge under such conditions that substantially all of the particles of said charge are contacted by said water vapor during the entire period of calcination whereby substantially complete defluorination of the phosphate rock is effected and the silica is for the most part converted to cristobalite, subjecting the defluorinated product to concentration to obtain a high grade phosphate product and a product of high cristobalite content, and utilizing the product of high cristobalite content as silica in the making up of additional calcining charge as aforesaid.

9. In defluorinating phosphate rock by calcination in the presence of silica and water vapor, the improvement which comprises preparing a calcining charge of finely divided phosphate rock intimately mixed with at least 35% by weight of finely divided silica mostly in the form of cristobalite, heating the charge to a temperature in excess of 2600° F. in the absence of substantial sintering and fusion, flowing a gaseous atmosphere containing a substantal amount of water vapor into positive and continuous contact with the charge under such conditions that substantially all of the particles of said charge are contacted by said water vapor during the entire period of calcination, subjecting the calcined product to concentration to obtain a high grade phosphate product and a product of high cristobalite content, and utilizing the product of high cristobalite content in preparing additional calcining charge as aforesaid.

ERNEST J. MAUST.

REFERENCES CITED

The following references are of record in the file of this patent:

UNITED STATES PATENTS

| Number | Name | Date |
| --- | --- | --- |
| 1,120,917 | Downs | Dec. 15, 1914 |
| 1,235,552 | Chappell | Aug. 7, 1917 |
| 1,869,019 | McIntyre | July 26, 1932 |
| 2,044,774 | Curtis | June 23, 1936 |
| 2,093,176 | Tromel | Sept. 14, 1937 |
| 2,121,776 | Baily | June 28, 1938 |
| 2,183,379 | Franck et al. | Dec. 12, 1939 |
| 2,189,248 | Luscher | Feb. 6, 1940 |

FOREIGN PATENTS

| Number | Country | Date |
| --- | --- | --- |
| 418,788 | Great Britain | Oct. 31, 1934 |

OTHER REFERENCES

Reynolds et al.: Ind. and Eng. Chem., vol. 26, April 1934, pages 406–412.

Certificate of Correction

Patent No. 2,446,978.

August 10, 1948.

ERNEST J. MAUST

It is hereby certified that errors appear in the printed specification of the above numbered patent requiring correction as follows: Column 4, line 29, before "2600° F." insert *at least*; column 9, line 62, for "through" read *throughout*; and that the said Letters Patent should be read with these corrections therein that the same may conform to the record of the case in the Patent Office.

Signed and sealed this 30th day of November, A. D. 1948.

[SEAL]

THOMAS F. MURPHY,
*Assistant Commissioner of Patents.*